(12) United States Patent
Guiassa et al.

(10) Patent No.: US 12,276,962 B2
(45) Date of Patent: Apr. 15, 2025

(54) METHOD OF MACHINING A FEATURE IN AN AIRCRAFT ENGINE COMPONENT

(71) Applicant: PRATT & WHITNEY CANADA CORP., Longueuil (CA)

(72) Inventors: Rachid Guiassa, Longueuil (CA); Visal Ing, Ste. Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 611 days.

(21) Appl. No.: 17/648,616

(22) Filed: Jan. 21, 2022

(65) Prior Publication Data

US 2023/0297062 A1    Sep. 21, 2023

(51) Int. Cl.
| | | |
|---|---|---|
| *G05B 19/00* | (2006.01) | |
| *B23H 7/08* | (2006.01) | |
| *B23H 7/20* | (2006.01) | |
| *G05B 19/401* | (2006.01) | |
| *G05B 19/402* | (2006.01) | |
| *G05B 19/404* | (2006.01) | |

(52) U.S. Cl.
CPC ............ *G05B 19/401* (2013.01); *B23H 7/08* (2013.01); *B23H 7/20* (2013.01); *G05B 19/402* (2013.01); *G05B 19/404* (2013.01); *B23H 2500/20* (2013.01); *G05B 2219/45043* (2013.01)

(58) Field of Classification Search
None
See application file for complete search history.

(56) References Cited

U.S. PATENT DOCUMENTS

| | | | |
|---|---|---|---|
| 6,154,713 | A | 11/2000 | Peter et al. |
| 6,810,600 | B1 | 11/2004 | Horwarth et al. |
| 6,980,881 | B2 | 12/2005 | Greenwood et al. |
| 8,397,394 | B2 | 3/2013 | Hildebrand et al. |
| 9,880,544 | B2 | 1/2018 | Hull et al. |

(Continued)

FOREIGN PATENT DOCUMENTS

| | | |
|---|---|---|
| EP | 2 026 152 A2 | 2/2009 |
| EP | 3 611 583 A1 | 2/2020 |

OTHER PUBLICATIONS

Hagele W: "Workpiece Alignment With 3D Touch Probe Systems", Industrial and Production Engineering, Carl Hanser Verlag. Munchen, DE, No. 1, Mar. 1, 1989 (Mar. 1, 1989), pp. 32-34, XP000046434,ISSN: 0343-334X.

(Continued)

*Primary Examiner* — Paul B Yanchus, III
(74) *Attorney, Agent, or Firm* — NORTON ROSE FULBRIGHT CANADA LLP (57) ABSTRACT

A method of machining a feature in a component using a machine having a support rotatable about a rotation axis and having a cutting tool movable relative to the component, the component being mounted on the support for rotation about a central axis of the component, the method includes: determining coordinates of at least three points on a reference surface of the component, the at least three points being circumferentially offset from one another relative to the central axis; determining an angular correction to apply to the cutting tool based on the coordinates of the at least three points; and machining the feature in the component using the cutting tool angled with the angular correction.

18 Claims, 6 Drawing Sheets

(56) References Cited

U.S. PATENT DOCUMENTS

| | | |
|---|---|---|
| 10,139,806 B2 | 11/2018 | Szarski et al. |
| 2006/0102596 A1* | 5/2006 | Kinoshita .............. B23H 7/065 219/69.12 |
| 2013/0138241 A1* | 5/2013 | Arakawa ................. B23H 9/00 700/162 |
| 2018/0085840 A1* | 3/2018 | Jeon ........................ B23H 9/14 |
| 2021/0010791 A1 | 1/2021 | Puntigam et al. |
| 2021/0026318 A1 | 1/2021 | Blais et al. |
| 2021/0087933 A1 | 3/2021 | Ing et al. |

OTHER PUBLICATIONS

Florian Fern et al: "Coordinate trans formation and its uncertainty under consideration of a non-orthogonal coordinate base", Measurement Science and Technology, IOP Bristol, GB vol. 32, No. 4, Jan. 11, 2021 (Jan. 11, 2021), p. 45001, XP020365230, ISSN: 0957-0233, DOI: 10.1088/1361-6501/ABA3F5 [retrieved on Jan. 11, 2021].

European Search Report issued in counterpart application 23152945.4 on May 30, 2023.

\* cited by examiner

METHOD OF MACHINING A FEATURE IN AN AIRCRAFT ENGINE COMPONENT

TECHNICAL FIELD

The application relates generally to aircraft engines, such as gas turbine engines, and, more particularly, to systems and methods used for machining features such as firtree slots and teeth in components of such aircraft engines.

BACKGROUND OF THE ART

Aircraft engines include a plurality of components that may be manufactured by machining. As an example, compressor and turbine rotor discs may include slots, referred to as firtree slot, sized to accept correspondingly shaped bases of compressor and turbine blades. Splines used to couple these rotor discs to a shaft may also be manufactured by machining. Wire electrical discharge machining (WEDM) is a process by which a wire is fed through a component to be machined. The wire may be fed via spools to cut through a material of the component. In some cases, the wire and the component to be machined may be misaligned one relative to the other. Improvements are therefore sought.

SUMMARY

In one aspect, there is provided a method of machining a feature in a component using a machine having a support rotatable about a rotation axis and having a cutting tool movable relative to the component, the component being mounted on the support for rotation about a central axis of the component, the method comprising: determining coordinates of at least three points on a reference surface of the component, the at least three points being circumferentially offset from one another relative to the central axis; determining an angular correction to apply to the cutting tool based on the coordinates of the at least three points; and machining the feature in the component using the cutting tool angled with the angular correction.

The method may include any of the following features, in any combinations.

In some embodiments, the method comprises mounting the component to the rotatable support via a locator slidably received within a bore of the component, the locator defining a shoulder for abutting against a face of the component.

In some embodiments, the method comprises centering the component with the rotation axis of the rotatable support.

In some embodiments, the determining of the coordinates of the at least three points on the reference surface includes determining the coordinates of the at least three points on the reference surface being normal to the rotation axis.

In some embodiments, the determining of the coordinates of the at least three points includes determining probed coordinates of the at least three points by: probing a first point of the at least three reference points, the first point being probed at a first angular position of the component about the rotation axis; rotating the component about the rotation axis and probing a second point of the at least three reference points at a second angular position; and rotating the component about the rotation axis and probing a third point of the at least three reference points at a third angular position.

In some embodiments, the machine has a probe able to reach a probing zone, the method includes successively rotating the component about the rotation axis to bring the first point, the second point, and the third point within the probing zone.

In some embodiments, the determining of the angular correction includes determining a vector normal to the reference surface from the coordinates of the at least three points by: applying a coordinate transformation to the probed coordinates of the at least three points to move the at least three points to their actual locations to obtain the coordinates of the at least three points; generating at least two vectors from the coordinates of the at least three points; and computing the vector normal to the reference surface from the at least two vectors.

In some embodiments, the applying of the coordinate transformation includes, for each of the at least three points, computing:

$$P_{i,\alpha} = RCS_0 + (P_i - RCS_0)\cos(-\alpha_i) + (K \times (P_i - RCS_0))\sin(-\alpha_i) + K(K \cdot (P_i - RCS_0))(1 - \cos(-\alpha_i)),$$

where $\alpha_i$ denotes the angle between an $i^{th}$ point of the at least three points and a reference angular position, $RCS_0$ is a vector expressing the coordinates of an origin of a coordinate system of the support on a machine coordinate system of the machine, K is a unit vector expressing the rotation axis of the support, $P_i$ is a vector expressing the probed coordinates of the $i^{th}$ point on the machine coordinate system; and $P_{i,\alpha}$ is a vector expressing the coordinates of the $i^{th}$ point on the machine coordinate system.

In some embodiments, the angular correction corresponds to an angle between the vector normal to the reference surface and the rotation axis of the support, the machining of the feature in the component using the cutting tool angled with the angular correction includes tilting the cutting tool by the angular correction such that the cutting tool is parallel to the central axis of the component.

In some embodiments, the machine is a wire electro discharge machine, the cutting tool corresponding to a wire, the determining of the angular correction including determining the angular correction to apply to the wire.

In some embodiments, the machining of the feature includes cutting the feature with the wire.

In some embodiments, the method comprises rotating the component and cutting a second feature with the wire.

In another aspect, there is provided a cutting machine comprising: a support rotatable about a rotation axis and operable to support a component to be machined and to rotate the component about a central axis of the component; a cutting tool movable relative to the component; a probe movable relative to the component; and a controller having a processing unit and a computer-readable medium having instructions stored thereon executable by the processing unit for: determining coordinates of at least three points on a reference surface of the component, the at least three points being circumferentially offset from one another relative to the central axis; determining an angular correction to apply to the cutting tool based on the coordinates of the at least three points; and machining a feature in the component using the cutting tool angled with the angular correction.

The cutting machine may include any of the following features, in any combinations.

In some embodiments, the determining of the coordinates of the at least three points on the reference surface includes determining the coordinates of the at least three points on the reference surface being normal to the rotation axis.

In some embodiments, the determining of the coordinates of the at least three points includes determining probed coordinates of the at least three points by: probing a first point of the at least three reference points, the first point being probed at a first angular position of the component about the rotation axis; rotating the component about the rotation axis and probing a second point of the at least three reference points at a second angular position; and rotating the component about the rotation axis and probing a third point of the at least three reference points at a third angular position.

In some embodiments, the machine has a probe able to reach a probing zone, the determining of the coordinates including rotating the component about the rotation axis to bring the first point, the second point, and the third point within the probing zone.

In some embodiments, the determining of the angular correction includes determining a vector normal to the reference surface from the coordinates of the at least three points by: applying a coordinate transformation to the probed coordinates of the at least three points to move the at least three points to their actual locations to obtain the coordinates of the at least three points; generating at least two vectors from the coordinates of the at least three points; and computing the vector normal to the reference surface from the at least two vectors.

In some embodiments, the applying of the coordinate transformation includes, for each of the at least three points, computing:

$$P_{i,\alpha} = RCS_0 + (P_i - RCS_0)\cos(-\alpha_i) + (K \times (P_i - RCS_0))\sin(-\alpha_i) + K(K \cdot (P_i - RCS_0))(1 - \cos(-\alpha_i)),$$

where $\alpha_i$ denotes the angle between an $i^{th}$ point of the at least three points and a reference angular position, $RCS_0$ are the coordinates of an origin of a coordinate system of the support on a machine coordinate system of the machine, K is a unit vector expressing the rotation axis of the support, $P_i$ is a vector comprising the coordinates of the $i^{th}$ point on the machine coordinate system, and $P_{i,\alpha}$ is a vector expressing the coordinates of the $i^{th}$ point on the machine coordinate system.

In some embodiments, the angular correction corresponds to an angle between the vector normal to the reference surface and the rotation axis of the support, the machining of the feature in the component using the cutting tool angled with the angular correction includes tilting the cutting tool by the angular correction such that the cutting tool is parallel to the central axis of the component.

In some embodiments, the cutting machine is a wire electro discharge machine, the cutting tool corresponding to a wire, the determining of the angular correction including determining the angular correction to apply to the wire.

DESCRIPTION OF THE DRAWINGS

Reference is now made to the accompanying figures in which.

DETAILED DESCRIPTION

Figure 1:
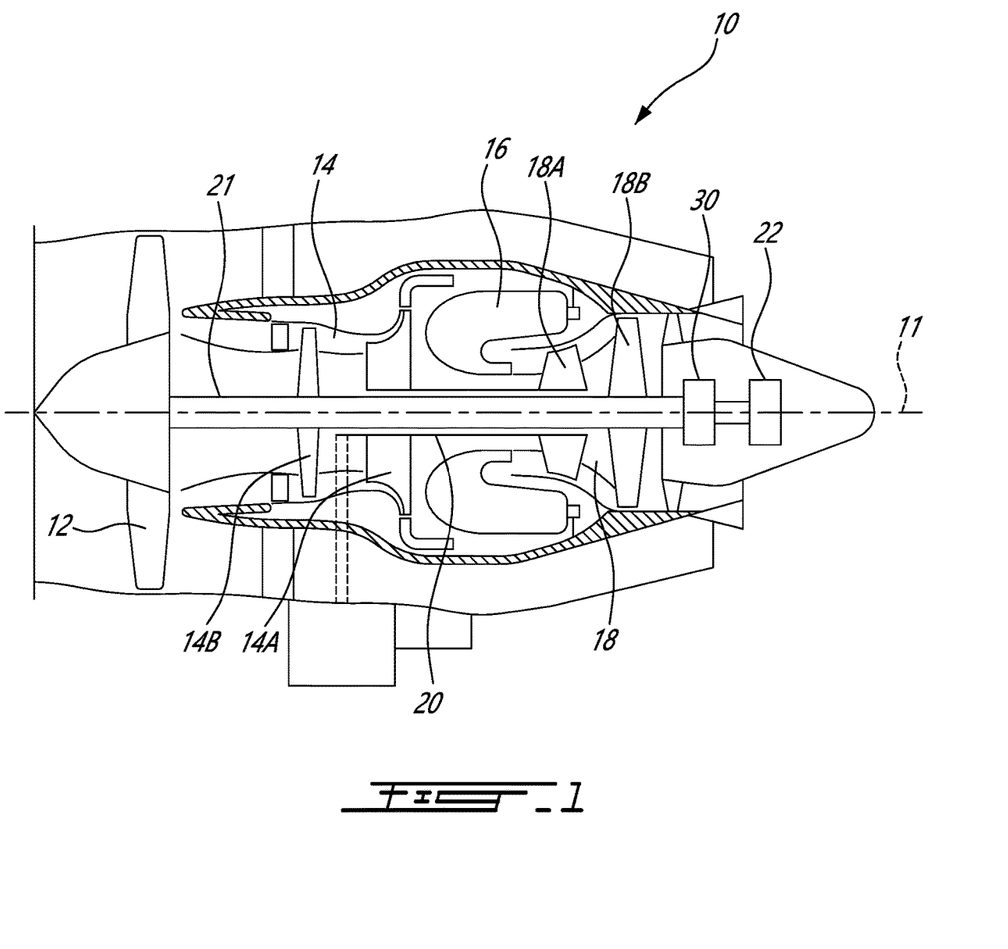
FIG. 1 is a schematic cross-sectional view of an aircraft engine depicted as a gas turbine engine in accordance with one embodiment.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section 18 to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure. In the embodiment shown, an accessory 22, which may be a generator, is drivingly engaged to the low-pressure shaft 21 via a gearbox 30.

Figure 2:
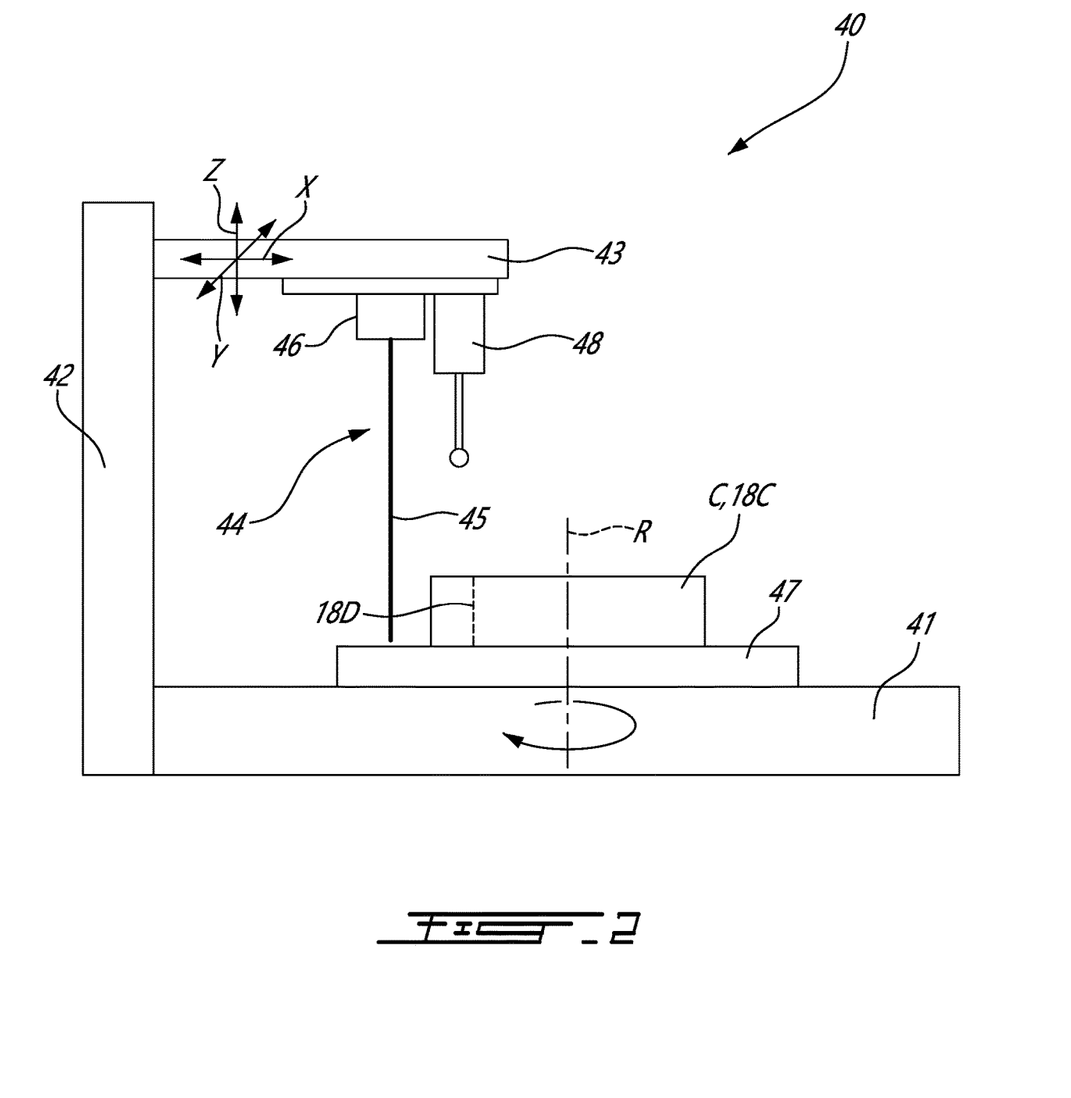
FIG. 2 is a schematic representation of a cutting machine depicted as a wire electro discharge machine.

Referring now to FIG. 2, a cutting machine is shown at 40. The cutting machine 40 includes a base 41, a vertical member 42 supported by the base 41, and a movable arm 43 operatively mounted to the vertical member 42. The cutting machine 40 has a cutting tool 44, which is depicted here as a wire 45. The wire 45 is operatively connected to a power source to be able to cut through the component via a process known as wire electro discharge machining (WEDM). In such a process, the wire 45 rotates continuously between two spools 46 to cut through a component C. Between the two spools 46, the wire 45 moves along a direction Z. Movements of the wire 45 in the X and Y directions are controlled by the movable arm 43. It will be appreciated that the contents of the present disclosure may apply to other cutting tools, such as drill bits, laser cutting, and so on.

The machine 40 includes a support 47 rotatably mounted to the base 41 and being rotatable about a rotation axis R. The component C to be machined is secured to the support 47. In such a case, for instance when the component C is a turbine disc 18C of the turbine section 18, a plurality of firtree slots 18D are to be machined and are circumferentially interspaced around a periphery of the turbine disc 18C. The same goes for teeth of a spline, or of a gear, or any other component that defines features (e.g., apertures, bores, scallops, etc) on its periphery. The support 47 therefore allows the component C to be rotated about the rotation axis R to machine subsequent features around its periphery (e.g., subsequent firtree slots). The machine 40 is further equipped with a probe 48 secured to the movable arm 43. The movable arm 43 may be actuated to move the probe 48 within a probing zone PZ (FIG. 5) to contact the component C at a plurality of locations within the probing zone PZ. However, the probing zone PZ is smaller than the component C, which render difficult the probing of all locations on the component C. More detail about this are present herein below.

Figure 3:
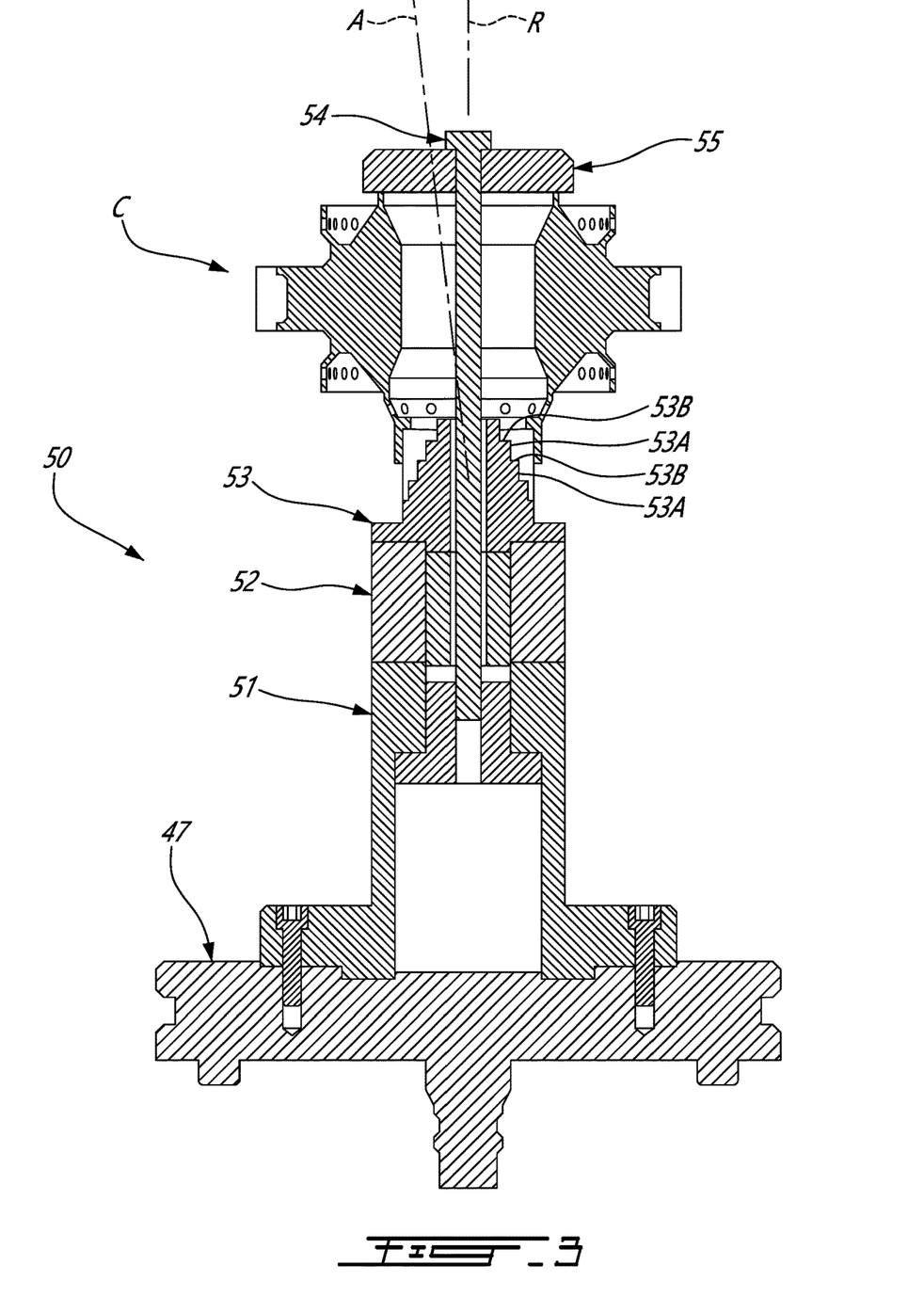
FIG. 3 is a cross-sectional view of a fixture system used to secure a component to be machined with the machine of FIG. 2 on a support of the machine of FIG. 2.

Referring now to FIG. 3, a fixture system is shown at 50. The fixture system 50 is used to secure the component C to the support 47. The fixture system 50 is used as an interface between the component C and the support 47 and may allow to move the component C at the desired location for proper interaction with the cutting tool 44. In some cases, the fixture system 50 may be avoided and the component C may be directly secured to the support 47. In the embodiment shown, the fixture system 50 includes a base 51, a spacer 52, and a locator 53. The base 51 may be secured (e.g., fastened) to the support 47. The spacer 52 may be disposed axially between the locator 53 and the base 51 relative to the rotation axis R. The spacer 52 may have a height taken along the rotation axis R selected to elevate the component C for proper interaction with the cutting tool 44. The locator 53 may define a plurality of cylindrical sections 53A of varying diameter and a plurality of shoulders 53B at intersections between the cylindrical sections 53A. The locator 53 may be inserted inside a bore defined by the component C until a face of the component C becomes in abutment against one of the shoulders 53B. The locator 53 may therefore be used to align the component C with the rotation axis R such that a central axis A of the component is substantially centered relative to the rotation axis R of the support 47. A fastener 54 may be inserted through the component C, the locator 53, the spacer 52 and may be fastened to the base 51 or the support 47 to clamp the component C. A washer or cover 55 may be disposed between the component C and a head of the washer if need be.

The fixture system 50 may allow to machine different components of varying sizes with the same cutting machine 40 by using different spacers 52 and/or locators 53. However, each of the base 51, spacer 52, and locator 53 may present their own manufacturing tolerances. Consequently, the stacking of the base 51, spacer 52, and locator 53 may result in the rotation axis R being offset (e.g., non-parallel) from the central axis A of the component C. Thus, a shape of the different features (e.g., firtree slots) machined on the periphery of the component C may be offset from a desired shape. For instance, this offset may result in the features being unsuitably angled. This may result in the component C being unsuitable for use in the gas turbine engine 10. In some embodiments, the fixture system 50 may not include the locator, spacer, or base.

Figure 4:
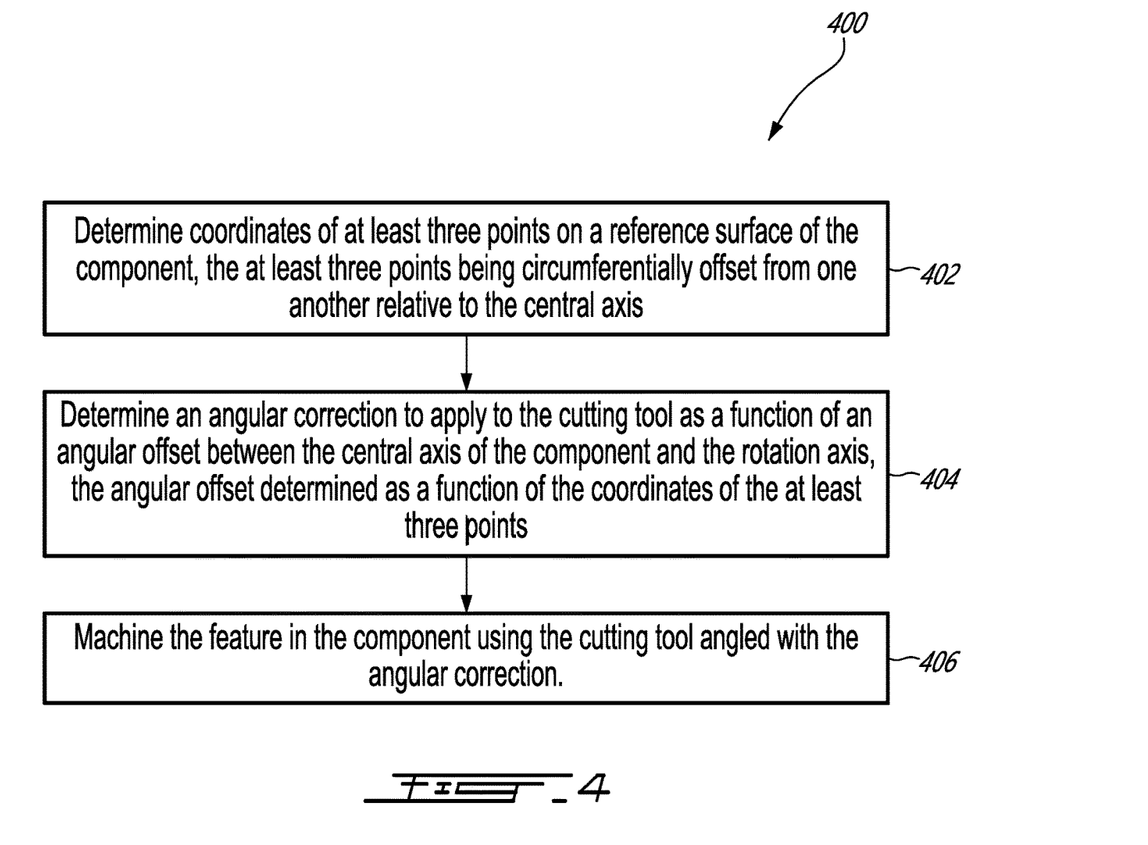
FIG. 4 is a flowchart illustrating steps of a method of machining a feature in a component with the machine of FIG. 2.

Referring now to FIG. 4, a method for manufacturing a feature in the component C is shown at 400. The method 400 may partially alleviate the aforementioned drawbacks. The method 400 may include mounting the component C on the support 47 such that the component C is rotatable about the central axis A of the component C with rotation of the support 47 about the rotation axis R. As shown in FIG. 3, the mounting of the component C on the support 47 may include mounting the component C to the rotatable support 47 via the fixture system 50, which may include the locator 53 slidably received within a bore of the component C. The mounting of the component C on the support 47 may include centering the component C with the rotation axis R of the rotatable support 47.

At which point, the method 400 includes determining an angular offset between the rotation axis R and the central axis A. This angular offset is depicted in FIG. 3 and is exaggerated for illustration purposes. This angular offset is then used to calculate an angular correction to apply to the cutting tool 44 (e.g., wire 45) such that the features are adequately manufactured. In some cases, the angular correction corresponds to the angular offset. For instance, the angular correction may allow to compensate for the angular offset between the rotation axis R and the central axis A to avoid obtaining firtree slots that slope toward the central axis A from a first axial face of the turbine disc 18C to a second opposite axial face thereof.

Figure 5:
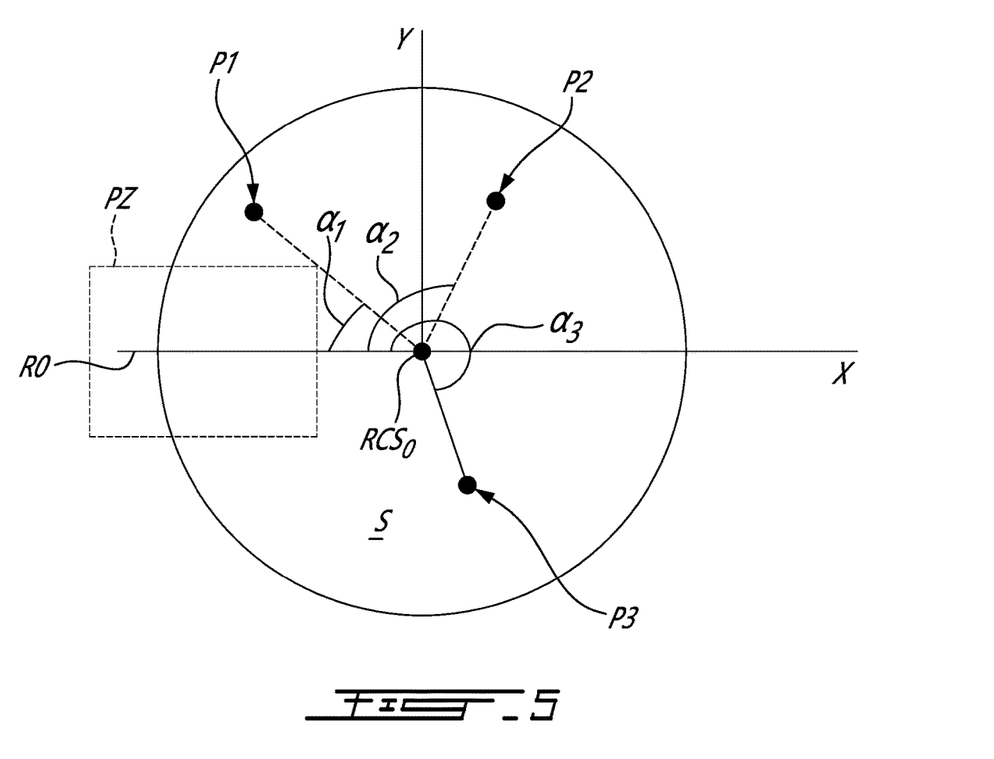
FIG. 5 is a top view of the component to be machined.
Figure 6:
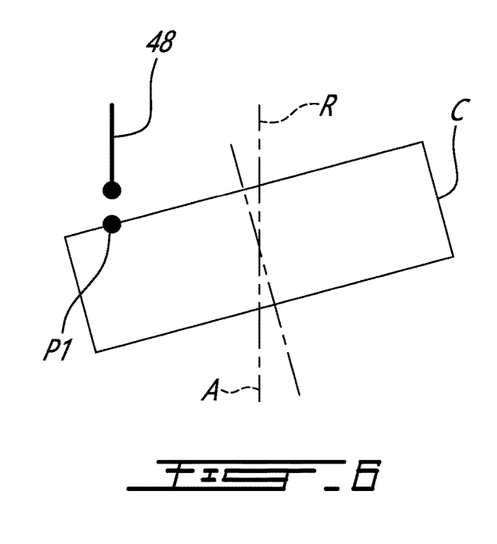
FIG. 6 is a side view of the component shown at a first angular position.

Referring to FIGS. 4-6, the method 400 includes determining coordinates of at least three points P1, P2, P3 on a reference surface S of the component C at 402. The at least three points P1, P2, P3 are circumferentially offset from one another relative to the central axis A of the component C. In other words, each of the at least three points P1, P2, P3 are located at a respective angular position of the component C about the rotation axis R. As shown in FIG. 5, the reference surface S may be normal to the central axis A of the component C. The probing of the reference surface S, which may be done with the probe 48 of the machine 40, may be achieved solely within the boundaries of a probing zone PZ because of movements limitations of the movable arm 43 (FIG. 2) of the machine 40. Consequently, the component C may be rotated to bring each desired probing locations of the at least three points P1, P2, P3 within the probing zone PZ. In the embodiment shown, the determining of the coordinates of the at least three points P1, P2, P3 includes probing a first point P1 of the at least three reference points, the first point P1 being probed at a first angular position of the component C about the rotation axis R; rotating the component C about the rotation axis R and probing a second point P2 of the at least three reference points at a second angular position; and rotating the component C about the rotation axis R and probing a third point P3 of the at least three reference points at a third angular position. Stated differently, the component C is rotated with the support 47 about the rotation axis R such that each of the three points P1, P2, P3 are successively brought within the probing zone PZ for being probed by the probe 48 of the machine 40. The method 400 therefore includes successively rotating the component C about the rotation axis R to bring the first point P1, the second point P2, and the third point P3 within the probing zone PZ. This may include rotating the component C by a first angle $\alpha_1$ to bring the first point P1 in the probing zone PZ, then rotating the component C by a second angle $\alpha_2$ to bring the second point P2 in the probing zone PZ, then rotating the component C by a third angle as to bring the third point P3 in the probing zone PZ. The first, second, and third angle $\alpha_1$, $\alpha_2$, as are defined in reference to a reference angular position R0 of the component C. In some embodiments, one of the three angles may be 0.

The three points P1, P2, P3 may be located at a same radial distance from the rotation axis R. This may avoid requiring movements of the probe 48 along the X direction (FIG. 2) In some other embodiments, the three points P1, P2, P3 may be at different radial distances from the rotation axis R. The probe 48 may therefore be moved along the X direction to reach the different points P1, P2, P3.

Figure 7:
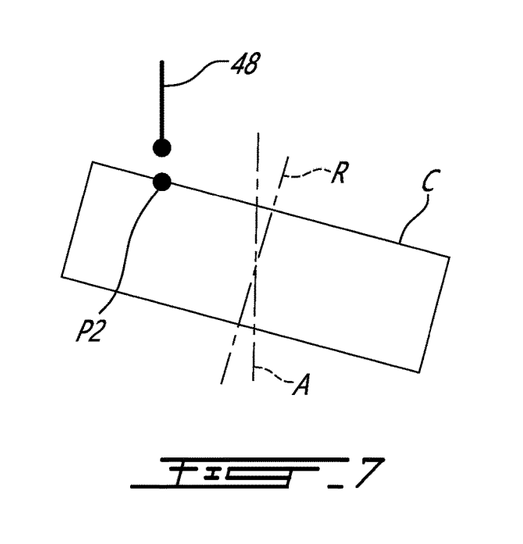
FIG. 7 is a side view of the component shown at a second angular position.

As shown in FIGS. 6-7, the offset between the rotation axis R of the support 47 and the central axis A of the component C results, in this example, in the first point P1 being at a lower elevation than the second point P2 relative to the Z direction. However, in this particular example, if the central axis C of the component were coincident with the rotation axis R of the support 47, all of the three points P1, P2, P3 would be at the same elevation with respect to the Z direction. Consequently, if the wire 45 remains parallel to the rotation axis R, a radial depth of the features (e.g., firtree slots) will be non-uniform, which is undesired.

Therefore, the method 400 includes determining an angular correction to apply to the cutting tool 44 as a function of an angular offset between the central axis A of the component C and the rotation axis R at 404. This angular offset is determined as a function of the coordinates of the at least three points P1, P2, P3. More specifically, the step 404 of the determining the angular correction may include determining a vector normal to the reference surface S. This may be achieved by applying a coordinate transformation to the probed coordinates at least three points to move the at least three points from the location where they were probed to their actual location on the component C when the component C is at the reference angular position R0. More specifically, the probing of each of the at least three points P1, P2, P3 yields probed coordinates that correspond to the coordinates of the at least three points when they are located inside the probing zone PZ. However, the actual location of these three points P1, P2, P3 is outside the probing zone PZ and offset by the angle $\alpha_1, \alpha_2, \alpha_3$ by which it was required to rotate the component C to bring the three points P1, P2, P3 within the probing zone PZ.

To obtain the actual coordinates of the three points P1, P2, P3, a coordinate transformation is applied to the probed coordinates. This may be done by computing $$P_{i,\alpha}=RCS_0+(P_i-RCS_0)\cos(-\alpha_i)+(K\times(P_i-RCS_0))\sin(-\alpha_i)+K(K\cdot(P_i-RCS_0))(1-\cos(-\alpha_i)))$$

where $\alpha_i$ denotes the angle between the $i^{th}$ point of the at least three points P1, P2, P3 and the reference angular position R0, $RCS_0$ are the coordinates of an origin of a coordinate system of the support 47 on a machine coordinate system of the machine 40, K is a unit vector expressing the rotation axis R of the support 47, $P_i$ is a vector comprising the probed coordinates of the $i^{th}$ point on the machine coordinate system, which are obtained from the probing, and $P_{i,\alpha}$ is a vector comprising the coordinates of the $i^{th}$ point on the machine coordinate system.

Once the coordinates of the three points P1, P2, P3 are obtained following the above coordinate transformation, two vectors are derived from the three points P1, P2, P3. These two vectors are contained within the reference surface S. Then, the vector normal to the reference surface S may be computed. This may be done by computing a cross product of these two vectors.

The method 400 then includes machining the feature in the component C using the cutting tool 44 angled with the angular correction at 406. In the embodiment shown, the angular correction corresponds to an angle between the vector normal to the reference surface S and the rotation axis R of the support 47. The machining of the feature in the component C using the cutting tool 44 angled with the angular correction at 406 includes tilting the cutting tool 44 by the angular correction such that the cutting tool 44 is parallel to the central axis A of the component C.

In the embodiment shown, the method 400 includes centering of component C with the rotation axis R. This may include finding a center of the component C. This may be done by probing a peripheral face of the component C; the peripheral face facing a direction having a radial component relative to the central axis A of the component C. In the present case, this peripheral face is normal to the reference surface S. The probing of the peripheral face may include probing at least three points each being circumferentially spaced apart from one another relative to the central axis A.

As for the probing of the three points P1, P2, P3 on the reference surface, the probing of the at least three points on the peripheral face may include rotating the component C about the rotation axis R to successively bring the at least three points of the peripheral face within the probing zone PZ. At which point, the coordinate transformation described above may be applied to the probed coordinates of these at least three points to find the actual coordinates of these three points. Then, the center of the component C may be computed by fitting a circle using the coordinates of the at least three points of the peripheral face. This centering step may be done before or after the step of determining the angular correction.

The disclosed method may allow to avoid using an expensive fixture system that has tight tolerances to avoid this offset between the rotation axis R of the support 47 and the central axis A of the component C. The disclosed fixture system 50 may not need those tight tolerances because of the correction applied to the cutting tool 44 per the disclosed method 400. The disclosed method 400 may allow the optimization of the part alignment through a minimum of probed points. Machine design may be optimized by removing the requirement of extra workspace for probing. The disclosed fixture system 50 may allow the optimization of the setup by reducing the requirements for height repeatability in position and orientation. The method 400 may further allow to reduce the calibration inaccuracy impact on the alignment precision.

Figure 8:
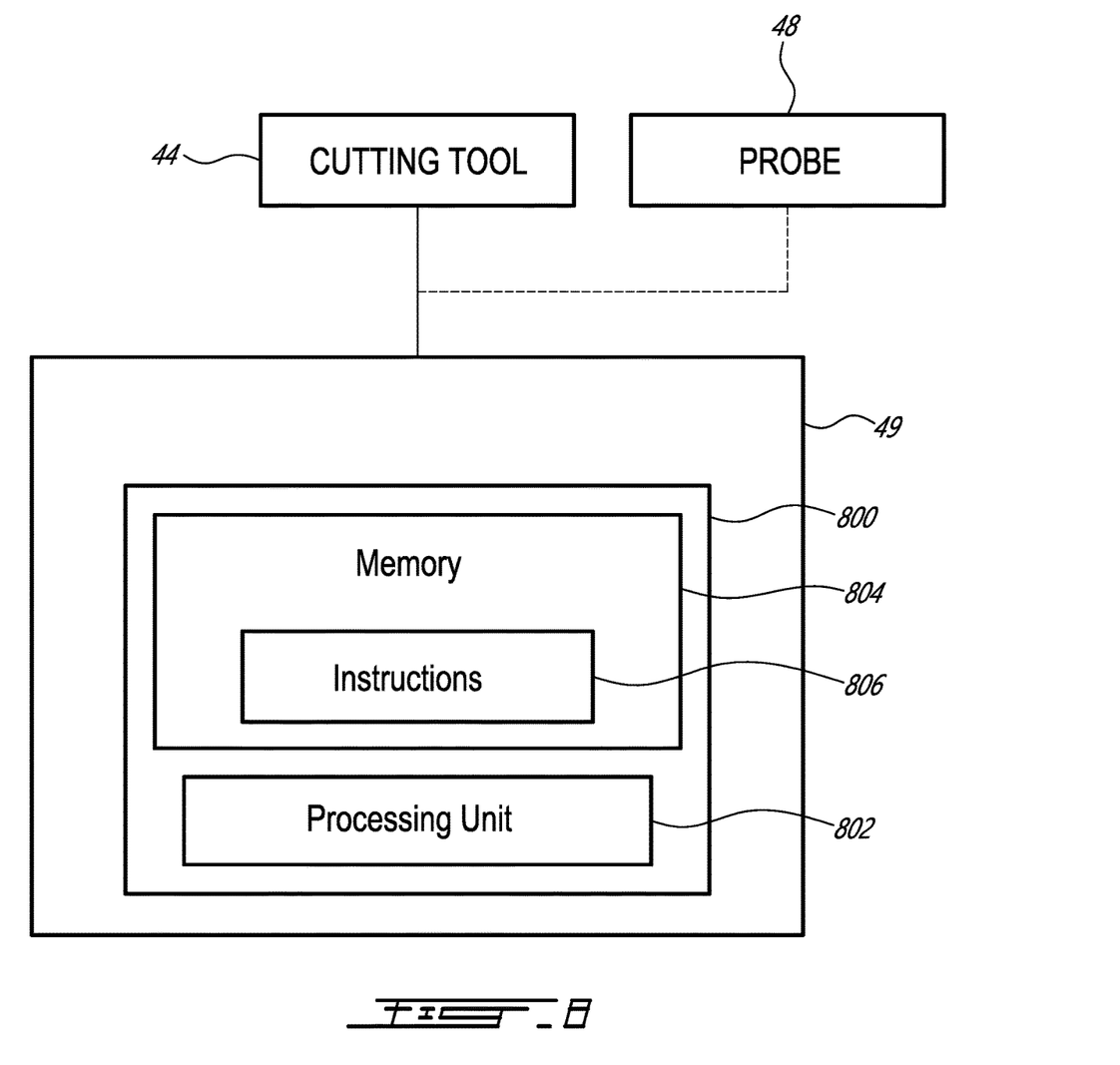
FIG. 8 is a schematic representation of a control system of the cutting machine of FIG. 2.

Referring now to FIG. 8, the cutting machine 40 may include a controller 49 operable to control movements of the cutting tool 44 and of the probe 48. The controller 49 may be able to store the different coordinates probed by the probe 48. The controller 49 may include one or more computing device 800. For simplicity only one computing device 800 is shown but the system may include more computing devices 800 operable to exchange data. The computing devices 800 may be the same or different types of devices.

The computing device 800 comprises a processing unit 802 and a memory 804 which has stored therein computer-executable instructions 806. The processing unit 802 may comprise any suitable devices configured to implement the method 400 such that instructions 806, when executed by the computing device 800 or other programmable apparatus, may cause the functions/acts/steps performed as part of the method 400 as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems for machining a feature in a component C described herein may be implemented in a high level procedural or object oriented programming or scripting language, or a combination thereof, to communicate with or assist in the operation of a computer system, for example the computing device 800. Alternatively, the methods and systems for machining a feature in a component C may be implemented in assembly or machine language. The language may be a compiled or interpreted language. Program code for implementing the methods and systems for machining a feature in a component C may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for machining a feature in a component C may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of machining a feature in a component using a machine having a support rotatable about a rotation axis and having a cutting tool movable relative to the component, the component being mounted on the support for rotation about a central axis of the component, the method comprising:
   determining coordinates of at least three points on a reference surface of the component, including determining probed coordinates of the at least three points by:
      probing a first point of the at least three points, the first point being probed at a first angular position of the component about the rotation axis;
      rotating the component about the rotation axis and probing a second point of the at least three points at a second angular position; and
      rotating the component about the rotation axis and probing a third point of the at least three points at a third angular position;
   determining an angular correction to apply to the cutting tool based on the coordinates of the at least three points; and
   machining the feature in the component using the cutting tool angled with the angular correction.

2. The method of claim 1, comprising mounting the component to the rotatable support via a locator slidably received within a bore of the component, the locator defining a shoulder for abutting against a face of the component.

3. The method of claim 1, comprising centering the component with the rotation axis of the rotatable support.

4. The method of claim 1, wherein the determining of the coordinates of the at least three points on the reference surface includes determining the coordinates of the at least three points on the reference surface being normal to the rotation axis.

5. The method of claim 1, wherein the machine has a probe able to reach a probing zone, the method includes successively rotating the component about the rotation axis to bring the first point, the second point, and the third point within the probing zone.

6. The method of claim 1, wherein the determining of the angular correction includes determining a vector normal to the reference surface from the coordinates of the at least three points by:

applying a coordinate transformation to the probed coordinates of the at least three points to move the at least three points to their actual locations to obtain the coordinates of the at least three points;

generating at least two vectors from the coordinates of the at least three points; and computing the vector normal to the reference surface from the at least two vectors.

7. The method of claim 6, wherein the applying of the coordinate transformation includes, for each of the at least three points, computing:

$$P_{i,\alpha} = RCS_0 + (P_i - RCS_0)\cos(-\alpha_i) + (K \times (P_i - RCS_0))\sin(-\alpha_i) + K(K \cdot (P_i - RCS_0))(1 - \cos(-\alpha_i)),$$

where $\alpha_i$ denotes the angle between an $i^{th}$ point of the at least three points and a reference angular position, $RCS_0$ is a vector expressing the coordinates of an origin of a coordinate system of the support on a machine coordinate system of the machine, K is a unit vector expressing the rotation axis of the support, $P_i$ is a vector expressing the probed coordinates of the $i^{th}$ point on the machine coordinate system; and $P_{i,\alpha}$ is a vector expressing the coordinates of the $i^{th}$ point on the machine coordinate system.

8. The method of claim 6, wherein the angular correction corresponds to an angle between the vector normal to the reference surface and the rotation axis of the support, the machining of the feature in the component using the cutting tool angled with the angular correction includes tilting the cutting tool by the angular correction such that the cutting tool is parallel to the central axis of the component.

9. The method of claim 1, wherein the machine is a wire electro discharge machine, the cutting tool corresponding to a wire, the determining of the angular correction including determining the angular correction to apply to the wire.

10. The method of claim 9, wherein the machining of the feature includes cutting the feature with the wire.

11. The method of claim 9, comprising rotating the component and cutting a second feature with the wire.

12. A cutting machine comprising:

a support rotatable about a rotation axis and operable to support a component to be machined and to rotate the component about a central axis of the component;

a cutting tool movable relative to the component;

a probe movable relative to the component; and a controller having a processing unit and a computer-readable medium having instructions stored thereon executable by the processing unit for:

determining coordinates of at least three points on a reference surface of the component, including determining probed coordinates of the at least three points by:

probing a first point of the at least three points, the first point being probed at a first angular position of the component about the rotation axis;

rotating the component about the rotation axis and probing a second point of the at least three points at a second angular position; and rotating the component about the rotation axis and probing a third point of the at least three points at a third angular position;

determining an angular correction to apply to the cutting tool based on the coordinates of the at least three points; and machining a feature in the component using the cutting tool angled with the angular correction.

13. The cutting machine of claim 12, wherein the determining of the coordinates of the at least three points on the reference surface includes determining the coordinates of the at least three points on the reference surface being normal to the rotation axis.

14. The cutting machine of claim 12, wherein the machine has a probe able to reach a probing zone, the determining of the coordinates including rotating the component about the rotation axis to bring the first point, the second point, and the third point within the probing zone.

15. The cutting machine of claim 12, wherein the determining of the angular correction includes determining a vector normal to the reference surface from the coordinates of the at least three points by:

applying a coordinate transformation to the probed coordinates of the at least three points to move the at least three points to their actual locations to obtain the coordinates of the at least three points;

generating at least two vectors from the coordinates of the at least three points; and computing the vector normal to the reference surface from the at least two vectors.

16. The cutting machine of claim 15, wherein the applying of the coordinate transformation includes, for each of the at least three points, computing:

$$P_{i,\alpha} = RCS_0 + (P_i - RCS_0)\cos(-\alpha_i) + (K \times (P_i - RCS_0))\sin(-\alpha_i) + K(K \cdot (P_i - RCS_0))(1 - \cos(-\alpha_i)),$$

where $\alpha_i$ denotes the angle between an $i^{th}$ point of the at least three points and a reference angular position, $RCS_0$ are the coordinates of an origin of a coordinate system of the support on a machine coordinate system of the machine, K is a unit vector expressing the rotation axis of the support, $P_i$ is a vector comprising the coordinates of the $i^{th}$ point on the machine coordinate system, and $P_{i,\alpha}$ is a vector expressing the coordinates of the $i^{th}$ point on the machine coordinate system.

17. The cutting machine of claim 15, wherein the angular correction corresponds to an angle between the vector normal to the reference surface and the rotation axis of the support, the machining of the feature in the component using the cutting tool angled with the angular correction includes tilting the cutting tool by the angular correction such that the cutting tool is parallel to the central axis of the component.

18. The cutting machine of claim 12, wherein the cutting machine is a wire electro discharge machine, the cutting tool corresponding to a wire, the determining of the angular correction including determining the angular correction to apply to the wire.

* * * * *